United States Patent [19]
Bhat et al.

[11] Patent Number: 5,672,323
[45] Date of Patent: Sep. 30, 1997

[54] ACTIVATED CARBON FLUE GAS DESULFURIZATION SYSTEMS FOR MERCURY REMOVAL

[75] Inventors: Pervaje A. Bhat, North Canton; Dennis W. Johnson, Barberton, both of Ohio

[73] Assignee: The Babcock & Wilcox Company, New Orleans, La.

[21] Appl. No.: 635,532

[22] Filed: Apr. 22, 1996

Related U.S. Application Data

[63] Continuation of Ser. No. 378,417, Jan. 26, 1995, abandoned.
[51] Int. Cl.$^6$ .................... B01D 50/00; C10B 17/20
[52] U.S. Cl. ............... 422/172; 423/243.01; 423/242.2; 423/447.6; 96/15; 96/151
[58] Field of Search ............... 422/172; 423/210, 423/243.01, 245.1, 230, 242.2, 414, 447.6; 96/15, 151

[56] References Cited

U.S. PATENT DOCUMENTS

| | | | |
|---|---|---|---|
| 3,892,837 | 7/1975 | Uchiyama et al. | 423/243 |
| 3,981,972 | 9/1976 | Hishinuma et al. | 423/244 |
| 4,273,747 | 6/1981 | Ramussen | 423/210 |
| 4,857,183 | 8/1989 | Bommer | 210/127 |
| 4,889,698 | 12/1989 | Moller et al. | 423/210 |
| 4,975,264 | 12/1990 | Franken | 423/522 |
| 5,139,982 | 8/1992 | Ayala et al. | 502/182 |
| 5,238,665 | 8/1993 | Lerner | 423/240 |
| 5,246,471 | 9/1993 | Bhat et al. | 55/223 |
| 5,308,509 | 5/1994 | Bhat et al. | 210/770 |
| 5,354,363 | 10/1994 | Brown, Jr. et al. | 95/134 |
| 5,405,503 | 4/1995 | Knudson | 423/244.03 |

OTHER PUBLICATIONS

"The Fate of Mercury In Coal-Fired Power Plants and the Influence of Wet Flue Gas Desulphurization", R. Meij, Water, Air and Soil Pollution, 56: 21–33, 1991.

"Mercury Emission Reduction Using Activated Carbon with Spray Dryer Flue Gas Desulfurization", R. Geiser, et al., 56th Annual American Power Conference, Apr., 1994.

"Control of Mercury from MSW Combustors by Spray Dryer Absorption Systems and Activated Carbon Injection", R. Gleiser, MWC Conference Proceeding Sponsored by AWMA, Williamsberg, VA, 1993.

"Mercury Removal by Wet Limestone FGD Systems: EPRI HSTC Test Results", J. Peterson et al., 87th AWMA Meeting, Cincinnati Jun. 19–24, 1994.

"Pilot Scale Eval. of Carbon Compound Additives for the Removal of Mercury at Coal–Fired Utility Power Plants", R. Chang, et al., 2nd Int. EPRI Conf. Managing Hazardous Pollution, 1993.

"Bench Scale Sorption and Desorption of Mercury with Activated Carbon", B. K. Gullett, et al., Int. MWC Conf. Proc., Williamsburg, VA. 1993.

"An Economic Alternative to Controlling Acid Gases, Mercury, and Dioxin from MWCs", A. Licata, et al., 87th AWMA, Jun. 19–24, 1994.

"Sorbent Injection for Flue Gas Mercury Control," R. Chang et al., AWMA Conf., Jun. 1994.

"Developing Mercury Removal Methods for Power Plants", R. Chang et al. EPRI Journal Jul. 1994.

(List continued on next page.)

*Primary Examiner*—Nina Bhat
*Attorney, Agent, or Firm*—Daniel S. Kalka; Robert J. Edwards

[57] ABSTRACT

Activated carbon injection is provided for mercury removal in a flue gas treatment system having an electrostatic precipitator and a wet flue gas desulfurization tower by injecting fresh activated carbon into the flue along with recycled carbon from the exhaust of the precipitator to minimize fresh carbon make up along with an activated carbon bed in the desulfurization tower to maximize mercury and other toxin removal from the flue exhaust.

15 Claims, 1 Drawing Sheet

OTHER PUBLICATIONS

"Control of Air Toxics From Coal–Fired Power Plants Using FGD Technology," Noblett, Jr. et al., EPRI., Jul. 1993.

"Consensus on Air Toxics Eludes Industry to Date", C. Jones *Power*, Oct. 1994.

"Control of Mercury in Fossil Fuel Fired Power Generation," J.R. Morency, DOE Mtg., Jun. 21, 1994.

94 TEC–I Status Report, "Mercury Emissions and Controls", E. Hall, Battelle, May 1, 1994.

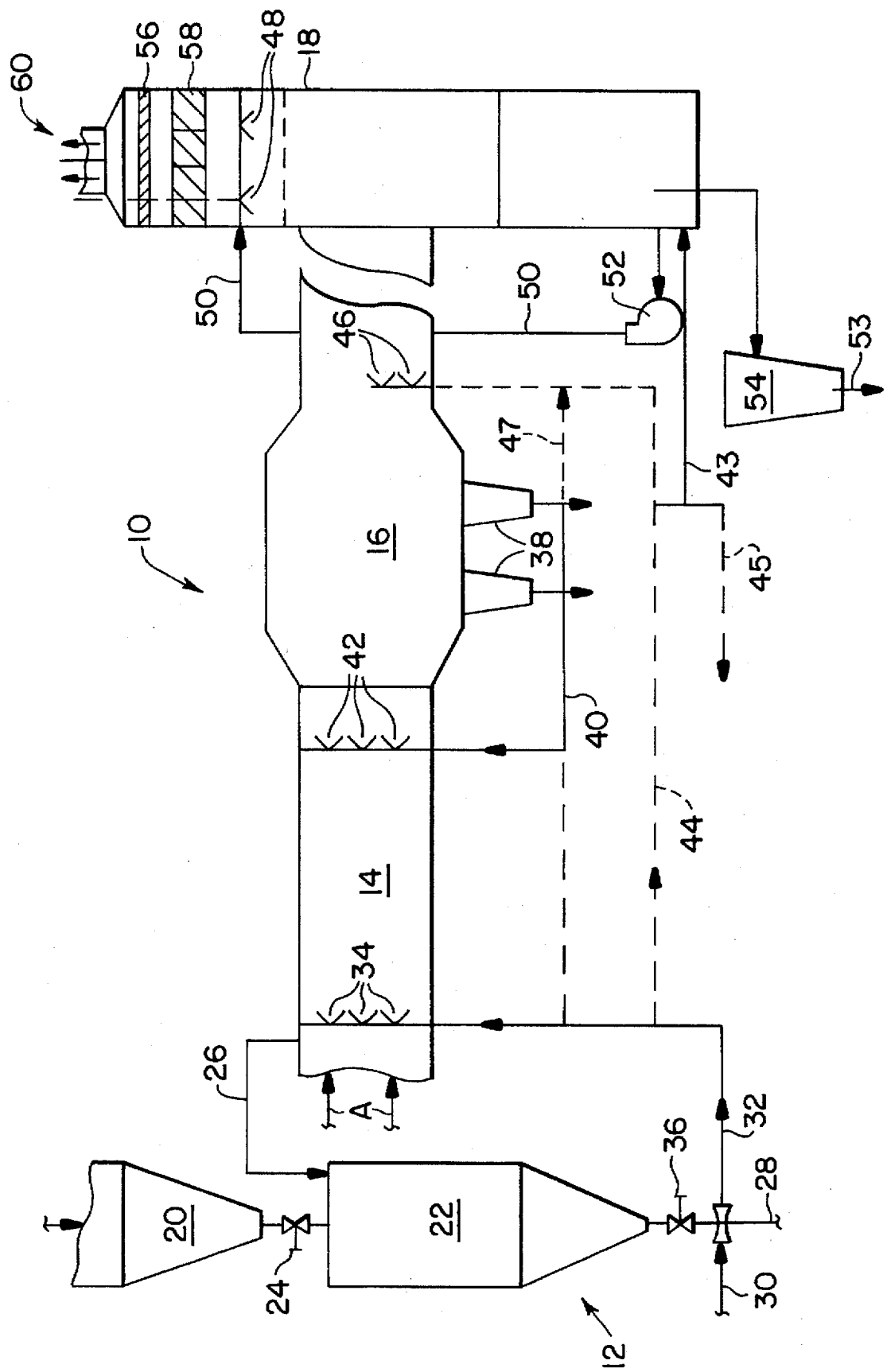

ACTIVATED CARBON FLUE GAS DESULFURIZATION SYSTEMS FOR MERCURY REMOVAL

This is a continuation of application Ser. No. 08/378,417 filed Jan. 26, 1995 now abandoned.

BACKGROUND OF THE INVENTION

1. Field of the Invention

The present invention is generally drawn to systems for removing environmentally harmful toxic material from flue exhausts and more particularly to systems for mercury removal from flue gases.

2. Description of the Prior Art

With the increase in the number and capacity of incinerator plants for refuse the treatment of flue gas from these plants is not restricted to removal of pollutants such as HCl, $SO_2$ and $NO_x$. Toxic components occurring in even minor amounts represent a risk to the environment due to their extreme toxicity. Among these toxic pollutants are mercury and various other noxious organic compounds. In flue gas from incineration of domestic refuse the amount of mercury vapor (which in this context means vapor of elemental mercury as well as mercury-containing chemical compounds in vapor phase) may vary within wide limits. Typical concentrations will be in the range of 100-1000 µg/NM$^3$. Numerous methods have been suggested for removing or recovering mercury from such flue gases.

U.S. Pat. No. 4,273,747 discloses removal of mercury from hot waste gases by atomizing an aqueous liquid into the waste gases in the presence of fly ash suspended in the gas and subsequently separating the fly ash together with a substantial part of the mercury originally present as vapor. It is essential that by this treatment the gas stream is cooled from a temperature of at least 200° C. to a temperature below 160° C. The aqueous liquid may be just water or it may be an aqueous solution or suspension of an alkaline compound, preferably calcium hydroxide.

Obviously this method will not be suitable in cases where it is not acceptable to cool the gas to the extent required or if the amount of fly ash is insufficient.

U.S. Pat. No. 4,889,698 discloses the removal of mercury utilizing activated charcoal powder combined with a basic absorbent. This mixture is injected into the flue upstream of a baghouse or electrostatic precipitator and a dry flue gas desulfurization unit. The mercury reacts with the charcoal and is trapped in the baghouse to be removed therefrom.

None of the above processes provide for the injection of untreated activated carbon to the flue along with recycled carbon and fly ash from a filter such as a electrostatic filter to minimize fresh carbon make up and remove the mercury prior to the desulfurization. Thus none of the prior art systems are easily retrofitted to existing filtering and desulfurization systems without the addition of an upstream absorption system to treat the carbon powder prior to flue injection.

BRIEF SUMMARY OF THE INVENTION

The present invention solves the problems associated with prior art mercury removal systems as well as others by providing an activated charcoal mercury removal system for flue gas which is easily retrofitted to existing electrostatic precipitators and wet flue gas desulfurization towers.

To accomplish this needed function the invention injects activated carbon into the flue gas through a series of header nozzles upstream of the electrostatic precipitator. A part of the reacted carbon and fly ash collected by the electrostatic precipitator is recycled and injected back into the flue gas to minimize the need for fresh activated carbon. The remaining carbon passing through the electrostatic precipitator continues to react with mercury in the wet flue desulfurization tower due to the lower operating temperature of the tower about 110°–150° providing enhanced mercury removal as well as the increased contact area for absorption provided by the liquid spray of the tower.

Should increased mercury removal capability be required, activated carbon powder may be injected before the wet flue gas desulfurization tower and after the outlet of the electrostatic precipitator. Also a granulated bed of activated carbon may be located in the tower outlet.

In view of the foregoing it will be seen that one aspect of the present invention is to retrofit an activated carbon injection mercury removal system to existing units with electrostatic precipitators and wet FGD (flue gas desulfurization) towers without extensive modifications especially with utility units or Municipal Waste Treatment units.

Another aspect of the invention is to provide a mercury removal system wherein a reduced amount of fresh carbon is required for mercury removal.

Yet another aspect of the present invention is to provide a mercury removal system using both powdered (before ESP) and granulated activated carbon (above mist eliminator in tower) to reduce other air toxics including Hg, $SO_3$, and HCl.

BRIEF DESCRIPTION OF THE DRAWINGS

The drawing depicts a schematic of the flue gas mercury removal system of the present invention.

DESCRIPTION OF THE PREFERRED EMBODIMENT

Referring now to the drawing it will be seen that a flue gas treatment system 10 is shown for combustion processes such as municipal waste combustion systems (not shown) which produce fly ash as well as toxic organics such as dioxins, furans and mercury.

The system 10 includes an activated carbon injection assembly 12 for injecting a predetermined amount of activated powdered carbon into a flue 14 supplied with flue gas, arrow A, from the municipal waste combustion system (not shown) upstream of an electrostatic precipitator 16 and a wet flue gas desulfurization tower 18 downstream of the electrostatic precipitator 16. The activated carbon injection assembly 12 is easily retrofitted to existing systems employing a precipitator 16 for fly ash and a particulate removal and wet flue gas desulfurization tower 18 for $SO_x$ removal. The present invention provides efficient toxic mercury removal at temperatures especially adapted for maximizing mercury removal by using activated powdered Carbon.

The activated carbon injection assembly 12 includes a hopper 20 for providing powdered activated carbon to a fluid bed 22 in an amount predetermined by a metering valve 24. The bed 22 maintains the powdered carbon in an actively mixed state by diverting flue gases from the flue 14 along vent 26 connecting the flue 14 to the fluid bed 22. This preheats the carbon to fluid bed 22 temperature. The carbon from the fluid bed 22 is injected into the flue 14 by an eductor 28 powered by an air line 30 supplying air from an air source (not shown) to aspirate the carbon mixture in the fluid bed 22 and convey the air carbon mixture along carbon convey line 32 feeding injection header nozzles 34 inside the flue 14.

The nozzles 34 are positioned in several pipes or ducts in a horizontal arrangement, but could also be arranged vertically. Each nozzle 34 consists of a pipe header of approximately 2" to 6" diameter having a plurality of about ¼" to 1" nozzle for uniform carbon injection into the flue 14. The injected activated carbon to the duct 14 is controlled by valve 36 to be typically below 12% by weight of total fly ash in the precipitator 16 including unreacted combustion coal since precipitator efficiency deteriorates drastically at carbon contents above this level.

The carbon reacts with mercury and is collected along with other particulates such as fly ash in the precipitator 16 and is discharged therefrom through hoppers 38. To minimize the amount of make up of fresh carbon, a part of the fly ash and carbon is recycled along line 40 to additional nozzles 42 or back to nozzles 34 exhausting this recycle into the flue 14 upstream of the precipitator 16 for additional mercury removal. In order to keep the fly ash recycle low, the carbon fly ash can be mechanically separated by known methods such as cyclones. This is not shown. Since some of the mercury may pass through the precipitator in an unreacted state an additional carbon injection area may be located at the exhaust of the precipitator 16 upstream of the wet scrubber tower 18. This area includes a line 44 shown as a dashed line connected to the carbon convey line 32 to feed carbon from the bed 22 to a series of injection nozzles 46 at the exhaust of the precipitator 16 or line also shown as a dashed line wherein carbon fly ash mixture is reinjected directly or after separation of the carbon. Any overflow may be sent either to the sump of tower 18 through line 43 or discharged for blowdown waste treatment through line 45.

Mercury removal is further enhanced in the tower 18 because of its lower temperature of operation and the absorption of the mercury by the carbon in the liquid wet spray along line 50 by the pump 52. The sludge formed at the bottom of the tower 18 is fed to a hydroclone 54 with any underflow sludge going by way of line 53 to a vacuum filter (not shown).

Additional mercury removal along with air toxics is accomplished by an activated carbon bed 56 of coarse carbon particles located downstream a mist eliminator 58 to provide clean flue gas from the exhaust 60 of the tower 18.

Certain modifications and additions have been deleted herein for the sake of conciseness and readability but are fully intended to be within the scope of the following claims. As an example, the fly ash may be separated from the carbon at the exhaust of the precipitator and only the carbon recycle for minimizing fresh carbon make up. Also the system could be adapted to a dry flue gas desulfurization tower or a baghouse instead of an electrostatic precipitator. For Fossil fuel fired units, the mercury concentration range is typically lower than incineractors, for example, 2–15 µg/Nm$^3$ (micrograms per normal cubic meter). Normal means standard temperature and pressure.

What is claimed is:

1. An air toxics removal assembly for a flue gas treatment system, comprising:

particulate removal means positioned in a flue duct for removing particulates from the flue gas;

a wet flue gas desulfurization tower located downstream of said particulate removal means and connected thereto by the flue duct for removing SO$_x$ from the flue gas;

fluid means for supplying heated powdered activated carbon;

first means for injecting heated activated carbon into the flue gas in the flue duct upstream of the particulate removal means for removing toxics from the flue gas, said first injecting means being connected to said fluid supplying means for receiving heated activated carbon;

means for recirculating injected activated carbon from said first injection means captured by said particulate removal means along with fly ash back into the flue gas, said recirculating means being connected to said particulate removal means; and second means for injecting recirculated activated carbon along with fly ash in the duct upstream of the particulate removal means, said second injecting means being connected to said recirculating means and supplied with recirculated activated carbon and fly ash.

2. An assembly as set forth in claim 1 wherein one of said toxics is mercury.

3. An assembly as set forth in claim 2 including a bed for activated carbon particles mounted at an exhaust of said wet flue gas desulfurization tower for mercury removal.

4. An assembly as set forth in claim 2 wherein said particulate removal means for removing particulates includes an electrostatic precipitator mounted in the flue duct.

5. An assembly as set forth in claim 4 wherein said first injecting means includes a first nozzle assembly mounted in the flue duct for injecting fresh activated carbon into the flue duct.

6. An assembly as set forth in claim 5 wherein said second injecting means includes a second nozzle assembly mounted in the flue duct and connected to said recirculating means, said second nozzle assembly exhausting the collected activated carbon and fly ash back into the flue duct to minimize the amount of fresh activated carbon injected into the flue duct by said first nozzle assembly.

7. An assembly as set forth in claim 6 including a third nozzle assembly located at the exhaust of the precipitator for exhausting fresh activated carbon thereto.

8. An assembly as set forth in claim 6 wherein the amount of activated carbon injected into the flue duct from said first and second nozzle assembly is less than approximately 12% of the total carbon collected by said precipitator.

9. An assembly as set forth in claim 1, further comprising beneficiation means for separating some of the fly ash from activated carbon prior to returning the activated carbon and remainder of the fly ash to the flue duct.

10. An activated carbon injection system for a flue gas treatment assembly having an electrostatic precipitator for removing particulates from the flue gas and a wet flue gas desulfurization tower connected downstream of the electrostatic precipitator and upstream of the flue exhaust, comprising:

fluid means for supplying activated carbon;

first means for injecting activated carbon into the flue duct upstream of the electrostatic precipitator for removing toxics from the flue gas, said injecting means being connected to said fluid supplying means and receiving activated carbon therefrom; and second means for injecting particulates removed from the flue gas back into the flue duct upstream of the electrostatic precipitator, said particulates injecting means being connected to the electrostatic precipitator and receiving particulates removed from the flue gas, said particulates removed from the flue gas including collected activated carbon and fly ash.

11. A system as set forth in claim 10 wherein the amount of activated carbon injected into the flue gas by said first and second injection means is less than approximately 12% of the total particulates removed by said electrostatic precipitator.

12. A system as set forth in claim 10 further comprising third means for injecting activated carbon into the exhaust of the electrostatic precipitator upstream of the wet flue gas desulfurization tower.

13. A system as set forth in claim 12 including a granular bed of activated carbon mounted at the exhaust of the wet flue gas desulfurization tower.

14. A system as set forth in claim 13 wherein said wet flue gas desulfurization tower includes a mist eliminator upstream of said granular bed of activated carbon.

15. A system as set forth in claim 12, wherein said third injection means injects collected activated carbon and fly ash from the electrostatic precipitator.

* * * * *